United States Patent [19]
Baals et al.

[11] Patent Number: 5,487,104
[45] Date of Patent: Jan. 23, 1996

[54] ARRANGEMENT FOR DISPLAYING MENU SCREENS ON A TELEPHONE TERMINAL

[75] Inventors: Kimberly A. Baals, Matawan; Kathleen J. Chylinski, Bridgewater; Darren A. Kall, Highland Park; Gary C. Smith, Freehold, all of N.J.

[73] Assignee: AT&T Corp., Murray Hill, N.J.

[21] Appl. No.: 363,562

[22] Filed: Dec. 22, 1994

Related U.S. Application Data

[63] Continuation of Ser. No. 47,590, Apr. 13, 1993, abandoned.

[51] Int. Cl.$^6$ ................................................. H04M 11/00
[52] U.S. Cl. ................................................. 379/96; 379/396
[58] Field of Search ....................... 379/96–98, 354–357, 379/88, 67, 61, 153, 90, 110, 396

[56] References Cited

PUBLICATIONS

Harris Dracon Division Advertisement, *Telephony Magazine*, Sep. 10, 1988, pp. 24–25.
IBM Technical Disclosure 1981, vol. 23, #9, Feb. 1981 pp. 4006–4008.
Cowart, Robert, *Mastering Windows 3.1* Sybex, 1992.
AT & T Answering System 1330 Owner's Manual, 1988.
Citibank, Enhanced Telephone brochure, © 1990, received by PTO on Apr. 2, 1990.

*Primary Examiner*—Wing F. Chan
*Attorney, Agent, or Firm*—Samuel R. Williamson

[57] ABSTRACT

An interactive display arrangement for easily moving between menu screens in a display device at a telephone terminal is provided. Ease of movement between the menu screens for certain logical functions is facilitated by a multipurpose screen prompt having a single softkey message. This softkey message is commonly displayed in each plurality of sets of softkey messages displayed in associated menu screens, with multiple tasks being assigned to this softkey label message. Each assigned task for the softkey message is determined by each menu screen in which the softkey message is displayed. By being able to use a single screen prompt for multiple functions, simplicity and screen space in a small interactive display is conserved. Also, the user of the display is able to move easily among available menu screens in the interactive display arrangement without the need for detailed knowledge of the menu hierarchy.

22 Claims, 3 Drawing Sheets

ARRANGEMENT FOR DISPLAYING MENU SCREENS ON A TELEPHONE TERMINAL

This application is a continuation of application Ser. No. 08/047590, filed on Apr. 13, 1993 now abandoned.

BACKGROUND OF THE INVENTION

1. Technical Field

This invention is directed to telephone terminals and more particularly, to a telephone terminal configurable by a user for accessing features available on the terminal through an interactive display arrangement.

2. Description of the Prior Art

Current trends in the design of telephone terminals indicate that more and more telephone functionality is being integrated into the telephone display. For example, information as to the features available on the display has migrated from LEDs to the display, and local additions such as directories, status inspection, incoming caller information etc., are all migrating to the display.

The technology presently in use in telephone displays is character-based liquid crystal device (LCD) displays. These displays are configured in various array sizes such as, for example, 2 line by 24 character LCD and 2 line by 40 character LCD. In order to be aesthetically pleasing when incorporated into the telephone housing, these displays tend to be small, typically on the order of one inch in height. Also, in order to provide a reasonable number of characters for information such as caller information and directory access information, a small font size for the characters is generally used.

Many interactive display arrangements available today permit accessing the features available on the display through softkeys. In order to provide a high level of functionally with a sufficient level of clarity in these displays, many softkey label screen prompts have heretofore been provided for accessing the available features. These screen prompts consume space in the display and thus limit the space available in the display for other selectable softkey functions. Although these screen prompts are provided to improve clarity and ease of use of the display as a user of the telephone terminal moves about in the hierarchy of menu screens, often they tend to be confusing as well.

For example, some display arrangements available in the prior art typically use two different softkey labels "SAVE" and "BACK" as screen prompts. The first softkey label SAVE is used for advancing at the same level in the menu hierarchy to a "sibling" menu screen. The second softkey label BACK is used for completing the task and moving up to a "parent" or the next higher level in the menu hierarchy. When these screen prompts are offered in the same menu screen, the user must be able to determine correctly the softkey label for advancing to the next sibling screen as well as the softkey label that abandons the feature being accessed and moves the display up to the parent screen in the menu hierarchy. It is desirable, therefore, that space in a small interactive display of a telephone terminal be conserved where possible. It is also desirable that a user of the telephone terminal be able to move among available menu screens in the interactive display arrangement in an easily understandable and error free manner.

SUMMARY OF THE INVENTION

The prior art problems are solved in accordance with the present invention by providing a user of a telephone terminal with an interactive display arrangement, wherein movement between menu screens for certain logical functions is controlled by a multipurpose screen prompt having a single softkey label. In the interactive display, a plurality of sets of softkey labels is provided. Each one of these sets of softkey labels is displayed in an associated menu screen.

In preferred embodiments, multiple tasks are assigned for at least one softkey label commonly displayed in the plurality of sets of softkey labels. The assigned task for the commonly displayed softkey label is determined by each menu screen in which the softkey label is displayed. By being able to use a single screen prompt for multiple functions, simplicity and space in the small interactive display is conserved. Also, the user of the display is able to move easily among available menu screens in the interactive display arrangement without the need for detailed knowledge of the menu hierarchy.

BRIEF DESCRIPTION OF THE DRAWING

This invention and its mode of operation will be more clearly understood from the following detailed description when read with the appended drawing in which.

Throughout the drawing, the same elements when shown in more than one figure are designated by the same reference numerals.

DETAILED DESCRIPTION

Figure 1:
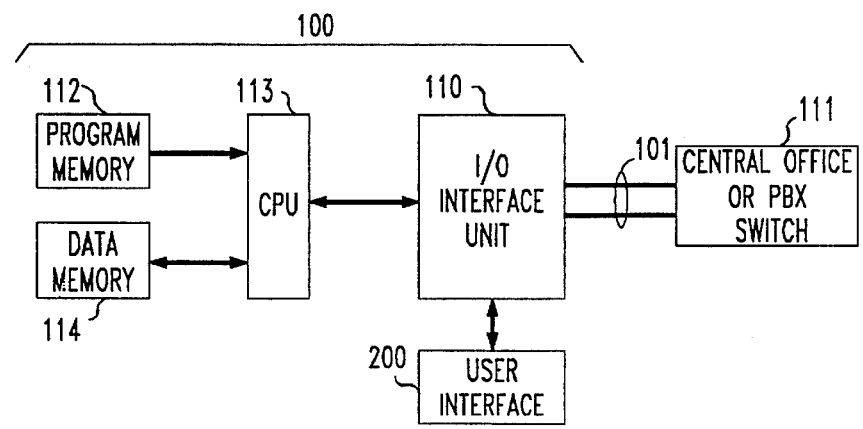
FIG. 1 is a block diagram of a telephone terminal usable for incorporating the present invention.
Figure 3:
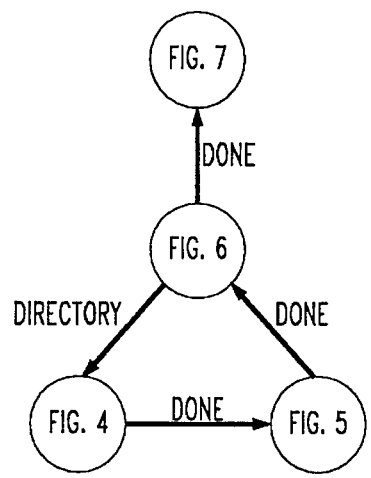
FIG. 3 is a state diagram showing one possible movement path between the menu screens illustrated in FIGS. 4 through 7.
Figure 4:
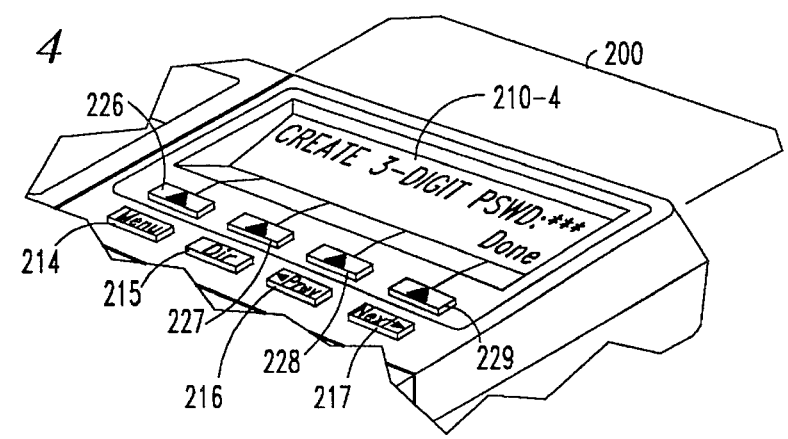
FIG. 4 illustrates the telephone terminal of FIG. 1 including a user interactive display displaying a second menu screen.

Referring now to FIG. 1, there is shown an illustrative block diagram of a telephone terminal 100 useful for describing the operation of the present invention. The terminal includes an input/output (I/O) interface unit 110 which connects to a telecommunication switch 111, such as the 5ESS® central office (CO) switch or the DEFINITY® private branch exchange (PBX) switch, via lines 101. This I/O interface unit 110 contains switching, control, and line circuits required by the terminal 100 for establishing, maintaining and terminating communication connections between the terminal and the CO or PBX switch 111. Through these circuits, the terminal 100 thus sends to and receives from the CO or PBX switch 111 switching and control signals.

The terminal also includes a program memory 112 which provides instructions to a central processor unit (CPU) 113 for controlling the various operating features and functions originating at the terminal. This program memory 112 also contains data for interpreting a plurality of codes representative of various network information received from the switch 111 and for generating codes to be transmitted to the switch 111. A data memory 114 is utilized by the CPU 113 for storing and accessing data associated with performing the various functions and features programmed in the program memory 112. In one embodiment, CPU 113 is a microprocessor, program memory 112 is read-only- memory (ROM) and data memory 114 is a random-access-memory (RAM). These components are readily available from a number of semiconductor manufacturers such as Intel, Motorola, AMD and NEC. Connected to the interface unit 110 is a user interface 200, the physical aspects of which are shown in greater detail in FIG. 2.

Figure 2:
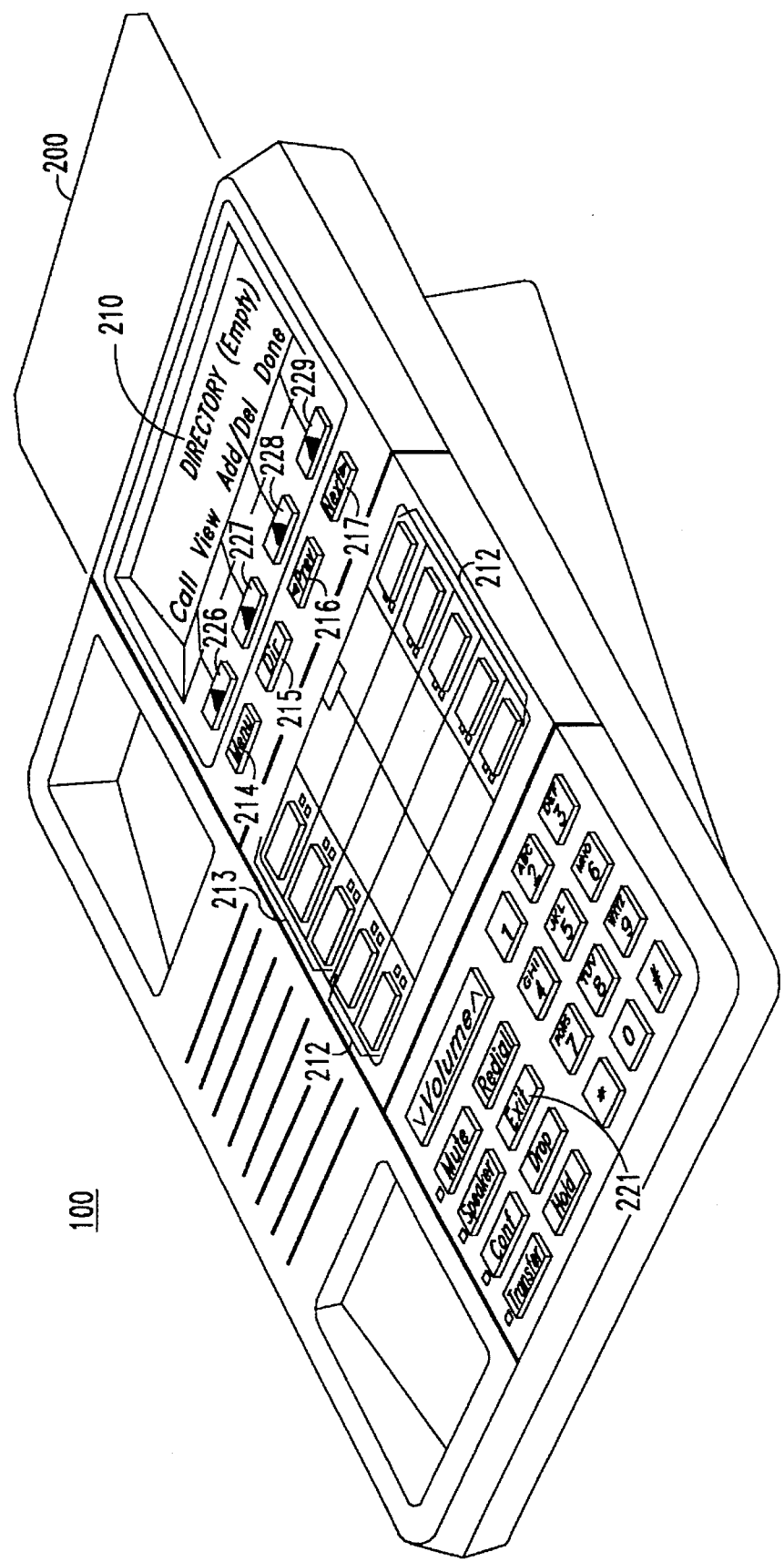
FIG. 2 illustrates the telephone terminal of FIG. 1 including a user interactive display displaying a first menu screen, accessible in accordance with the present invention.
Figure 5:
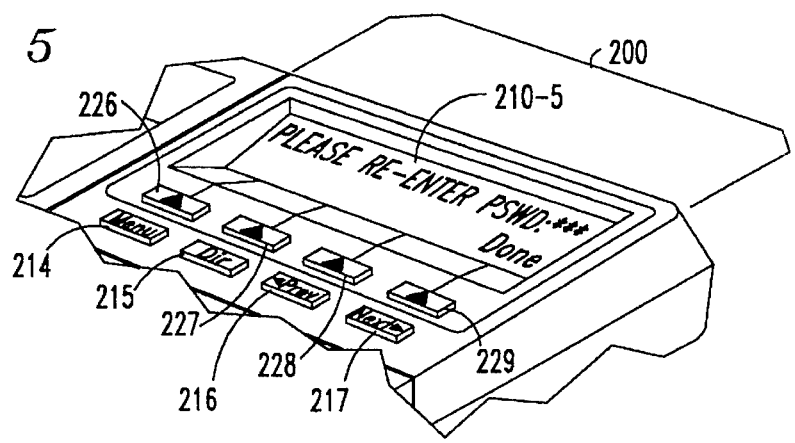
FIG. 5 illustrates the telephone terminal of FIG. 1 including a user interactive display displaying a third menu screen, accessible in accordance with the present invention.
Figure 6:
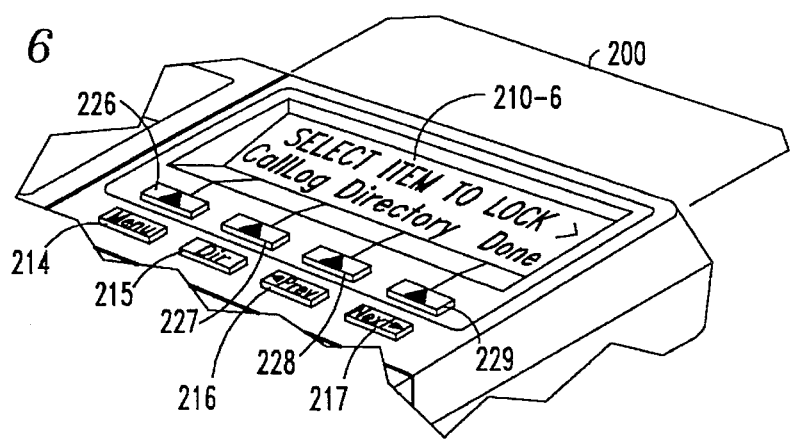
FIG. 6 illustrates the telephone terminal of FIG. 1 including a user interactive display displaying a fourth menu screen, accessible in accordance with the present invention.
Figure 7:
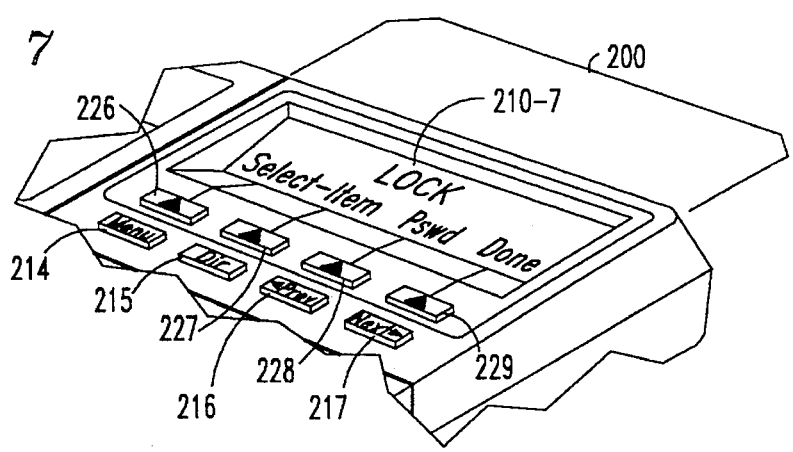
FIG. 7 illustrates the telephone terminal of FIG. 1 including a user interactive display displaying a fifth menu screen, accessible in accordance with the present invention.

With reference now to FIG. 2, the user interface 200 comprises a user interactive display 210, switch administered keys or buttons 212, call appearance keys or buttons 213, multiple hard keys 214 through 217, an "Exit" key 221 and softkeys 226 through 229. Other well-known keys or buttons are also illustrated as part of the telephone terminal shown in FIG. 2 but are not further described herein.

The multiple hard buttons 214 through 217 are respectively labeled "Menu", "Dir", "<Prev", and "Next>". The Menu button 214 is used to configure the terminal to the local softkey state, one aspect of which is described in greater detail later herein with reference to FIGS. 3 through 7. Similarly, the Dir button 215 also configures the terminal to the local softkey state, and also gives the user quick access to a local directory stored in the terminal with the first few entries appearing on the display. The <Prev and Next> buttons 216 and 217 are used to access additional menu items in both the local softkey state and in a network-based or switch feature state. In the local softkey state, for example, names and telephone numbers may be accessed by these buttons for entering or editing with the softkeys 226 through 229. Also the <Prev and Next> buttons 216 and 217 may be used in the switch feature state, for example, to display the previous or next entry in a directory query feature.

The labels and functions of the softkeys 226 through 229 appear on the associated display 210. The label or function for each of these keys changes dynamically as the user performs functions and makes selections via these softkeys. Shown in the display 210 is just one menu screen in the hierarchically arranged menu. The illustrated entry is that of a personal DIRECTORY which, although illustrated as empty, typically may support up to 30 directory entries. These directory entries may be edited or deleted by depressing the softkey 228. After any desired editing is completed, the terminal is informed of such completion by the user depressing the softkey 229.

While the embodiment of the present invention is described as being incorporated into a telephone terminal, it should be recognized that the present command-operated terminal could be utilized in other program-controlled systems. Since such systems utilize a variety of hardware and programming techniques, no attempt is made to describe the details of the program used to control the telephone terminal. However, the present invention must be blended into the overall structure of the system in which it is used and must be tailored to mesh with other features and operations of the system. Thus, in order to avoid confusion and in order to enable those skilled in the art to practice the claimed invention, this specification will describe the operation of the present invention using the telephone terminal 100 shown in both FIGS. 1 and 2 together with the state diagram of FIG. 3 and the menu screens 210-4, 210-5, 210-6 and 210-7 of FIGS. 4, 5, 6 and 7, respectively, which taken together describe the logical steps and the various parameters required to implement the present invention.

The interactive display arrangement facilitates ease of movement between menu screens in a display device at a telephone terminal, in accordance with the invention. In this regard and with reference next to FIG. 3, there is shown a state diagram illustrating a possible movement path between the menu screens shown in FIGS. 4 through 7. This state diagram provides a typical movement path for a user of the telephone terminal in order to create a password for locking a directory or a call log, as desired. An information message provided as a softkey label "Done" provides the logically appropriate next step for a user as the user moves among available menu screens. This information message is described in greater detail later herein with regard to the four illustrated information states in which the telephone terminal 100 may be configured. Information that corresponds to each state is provided in the menu screens of the display respectively associated with each of FIGS. 4 through 7.

In an illustration of the functionality of the information message provided by the softkey label Done and its interrelationship with the displays 210-4, 210-5, 210-6 and 210-7, the following operative description, in accordance with the invention, is provided.

If a user of the telephone terminal 100 while viewing the display 210-6 elects to lock the directory contained in the telephone terminal, pressing the softkeys 228 or 227 which at this point are commonly associated with the "Directory" softkey label causes the telephone terminal 100 to go down in the menu hierarchy and display the sibling menu screen shown in display 210-4. If while at this menu screen shown in display 210-6, however, the user elects not to lock any of the items available in the telephone display, then pressing the softkey 229 causes the telephone terminal to move up to the next higher level in the menu hierarchy and display the parent menu screen shown in display 210-7.

When the menu screen in display 210-4 is being displayed, as a result of being selected by a user pressing the Directory softkeys 227 or 228 while at the display 210-6, the user is asked to create, for example, a three digit password at the menu screen shown in this display 210-4. Once the three digit password is entered, the user presses the softkey 229 and the telephone terminal accepts this entry by advancing to the sibling menu screen shown in the display 210-5.

At this display 210-5, the user is asked to reenter the password for verification. After the password has been reentered, the user then presses the softkey 229 and the telephone terminal accepts this entry by returning to the menu screen shown in the display 210-6. As shown, the function for the Done softkey 229 changes dynamically as the user performs functions and makes selections via other softkeys. By this process, therefore, the user of the telephone terminal 100 is able to move easily among available menu screens in the interactive display without detailed knowledge of the menu hierarchy.

What has been described is merely illustrative of the present invention. Other applications to telephone, computer or other user interactive systems other than the disclosed system are contemplated as being within the knowledge of one skilled in the art and may be utilized without departing from the spirit and scope of the present invention.

We claim:

1. An arrangement for displaying menu screens of information messages in a limited available space in a display device at a telephone terminal, the arrangement comprising:

means for generating a plurality of sets of information messages in the telephone terminal, each one of the sets of information messages being displayed in an associated menu screen in said limited available space of said display device; and means for assigning different tasks for a selected information message, each task requiring movement from a displayed menu screen to another menu screen upon the completion of a specific task for another information message in the set of information messages in said displayed menu screen, and the selected information message being commonly displayed in each one of different sets of information messages.

2. The arrangement of claim 1 further including means for advancing from a displayed menu screen to a sibling menu screen at the same level in the menu hierarchy and means for moving from the displayed menu screen to a parent menu screen at the next higher level in the menu hierarchy.

3. The arrangement of claim 2 further including means for accessing by a user at the telephone terminal at least one information message in a set of information messages for performing a specific task requiring movement from the displayed menu screen to the sibling menu screen.

4. The arrangement of claim 3 wherein the assigning means, responsive to the accessing means, assigns to the selected information message the specific task of moving from the displayed menu screen to the sibling menu screen.

5. The arrangement of claim 2 further including means for accessing by a user at the telephone terminal at least one information message in a set of information messages for performing a specific task requiring movement from the displayed menu screen to the parent menu screen.

6. The arrangement of claim 5 wherein the assigning means, responsive to the accessing means, assigns to the selected information message the specific task of moving from the displayed menu screen to the parent menu screen.

7. An arrangement for displaying menu screens of information messages in a limited available space in a display device at a telephone terminal, the menu screens being representative of features available in the telephone terminal, the arrangement comprising:

means for generating a plurality of sets of information messages, each one of the sets of information messages being displayed in an associated menu screen in said limited available space of said display device and accessed in response to actuating an associated switch on the terminal;

means for performing specific tasks at each displayed menu screen, each information message within each set of information messages performing a specific task in the displayed menu screen; and means for assigning different specific tasks to a specific information message commonly located in each one of the sets of information messages, each assigned task for the specific information message being determined by each menu screen in which the information message is displayed, said assigned task requiring movement from a displayed menu screen to another menu screen upon the completion of a specific task for another information message in the set of information messages in said displayed menu screen.

8. The arrangement of claim 7 further including means for advancing from a displayed menu screen to a sibling menu screen at the same level in the menu hierarchy and means for moving from the displayed menu screen to a parent menu screen at the next higher level in the menu hierarchy.

9. The arrangement of claim 8 further including means for accessing by a user at the telephone terminal at least one information message in a set of information messages for performing a specific task requiring movement from the displayed menu screen to the sibling menu screen.

10. The arrangement of claim 9 wherein the assigning means, responsive to the accessing means, assigns to the specific information message the specific task of moving from the displayed menu screen to the sibling menu screen.

11. The arrangement of claim 8 further including means for accessing by a user at the telephone terminal at least one information message in a set of information messages for performing a specific task requiring movement from the displayed menu screen to the parent menu screen.

12. The arrangement of claim 11 wherein the assigning means, responsive to the accessing means, assigns to the specific information message the specific task of moving from the displayed menu screen to the parent menu screen.

13. A method of displaying menu screens of information messages in a limited available space in a display device at a telephone terminal, the menu screens being representative of features available in the telephone terminal, the method comprising the steps of:

generating a plurality of sets of information messages, each one of the sets of information messages being displayed in an associated menu screen in said limited available space of said display device and accessed in response to actuating an associated switch on the terminal;

performing specific tasks at each displayed menu screen, each information message within each set of information messages performing a specific task in the displayed menu screen; and assigning different specific tasks to a selected information message located in each one of the sets of information messages, each assigned task for the selected information message being determined by each menu screen in which the information message is displayed, said assigned task requiring movement from a displayed menu screen to another menu screen upon the completion of a specifically assigned task for another information message in the set of information messages in said displayed menu screen.

14. The method of claim 13 further including the steps of advancing from a displayed menu screen to a sibling menu screen at the same level in the menu hierarchy and moving from the displayed menu screen to a parent menu screen at the next higher level in the menu hierarchy.

15. The method of claim 14 further including the step of accessing by a user at the telephone terminal at least one information message in a set of information messages for performing a specific task requiring movement from the displayed menu screen to the sibling menu screen.

16. The method of claim 15 wherein the assigning step, responsive to the accessing step, assigns to the selected information message the specific task of moving from the displayed menu screen to the sibling menu screen.

17. The method of claim 14 further including the step of accessing by a user at the telephone terminal at least one information message in a set of information messages for performing a specific task requiring movement from the displayed menu screen to the parent menu screen.

18. The method of claim 17 wherein the assigning step, responsive to the accessing step, assigns to the selected information message the specific task of moving from the displayed menu screen to the parent menu screen.

19. The arrangement of claim 12 wherein the display device is a two line character display.

20. The method of claim 13 wherein the display device is a two line character display.

21. An arrangement for displaying menu screens of information messages in a two line character display device at a telephone terminal, the arrangement comprising:

means for generating a plurality of sets of information messages in the telephone terminal, each one of the sets of information messages being displayed in an associated menu screen in said two line character display; and means for assigning different tasks for a selected information message, each task requiring movement from a displayed menu screen to another menu screen upon the completion of a specific task for another information message in the set of information messages in said displayed menu screen, and the selected information message being commonly displayed in each one of different sets of information messages.

22. The arrangement of claim 21 wherein the selected information message is commonly displayed at the same location in different sets of information messages.

* * * * *